(12) United States Patent
Tsuo et al.

(10) Patent No.: US 7,280,169 B2
(45) Date of Patent: Oct. 9, 2007

(54) FLAT PANEL DISPLAY AND PANEL MODULE THEREOF

(75) Inventors: Chun-Tung Tsuo, Taoyuan (TW); Ching-Hui Yen, Kaohsiung (TW)

(73) Assignee: BENQ Corporation, Taoyuan (TW)

( * ) Notice: Subject to any disclaimer, the term of this patent is extended or adjusted under 35 U.S.C. 154(b) by 155 days.

(21) Appl. No.: 10/802,543

(22) Filed: Mar. 17, 2004

(65) Prior Publication Data

US 2005/0073623 A1    Apr. 7, 2005

(30) Foreign Application Priority Data

Oct. 1, 2003    (TW) ............................. 92127142 A (51) Int. Cl.
*G02F 1/1333* (2006.01)
*G06F 1/16* (2006.01)
(52) U.S. Cl. ........................ 349/58; 361/681
(58) Field of Classification Search .............. 349/58, 349/60; 361/681, 683, 686; 248/633, 636, 248/686
See application file for complete search history.

(56) References Cited

U.S. PATENT DOCUMENTS

| | | | |
|---|---|---|---|
| 6,411,501 B1* | 6/2002 | Cho et al. | 361/681 |
| 6,501,641 B1* | 12/2002 | Kim et al. | 361/681 |
| 2002/0080299 A1* | 6/2002 | Yun et al. | 349/58 |
| 2003/0025367 A1* | 2/2003 | Boudinot | 297/217.3 |

* cited by examiner

*Primary Examiner*—Toan Ton
*Assistant Examiner*—Tai Duong
(74) *Attorney, Agent, or Firm*—Quintero Law Office (57) ABSTRACT

A flat panel display and panel module thereof. The flat panel display includes a housing, a panel module and a main bracket. The panel module, contained in the housing, includes a front frame, a rear frame, and a panel. The front frame and the rear frame are assembled to encase the panel. The rear frame has at least one connecting portion, covered by the encased panel. The main bracket is disposed in the housing to connect the housing and the connecting portion of the rear frame.

20 Claims, 8 Drawing Sheets

FLAT PANEL DISPLAY AND PANEL MODULE THEREOF

BACKGROUND OF THE INVENTION

1. Field of the Invention

The present invention relates to a flat panel display and panel module thereof, and in particular to a flat panel display with a narrow frame creating better production efficiency.

2. Description of the Related Art

Flat panel displays comprise passive and active matrix display technologies. Liquid crystal display (LCD) is a common type of passive matrix display (PMLCD), and active matrix display includes plasma display panels (PDP), light emitting diodes (LED), vacuum fluorescent displays (VFD), electroluminescent displays (ELD), field emission displays (FED), and others.

Figure 1:
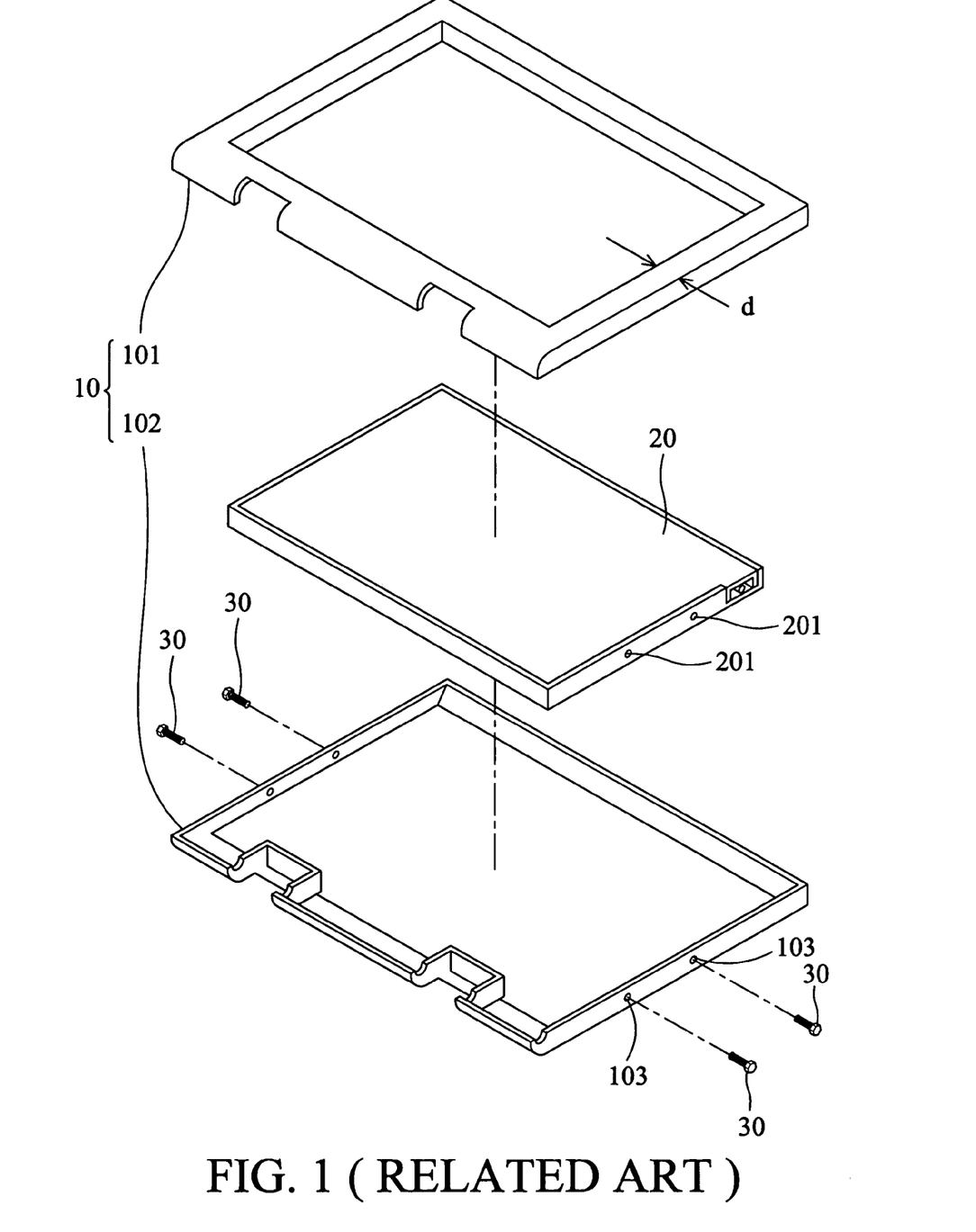
FIG. 1 is a perspective exploded view of a liquid crystal display disclosed in U.S. Pat. No. 5,835,139.

U.S. Pat. No. 5,835,139, as shown in FIG. 1, provides a liquid crystal display device. The liquid crystal display includes a housing 10 (made of plastic) and a panel module 20. The housing 10 has a front cover 101 and a rear cover 102, with the panel module 20 disposed therebetween. The covers 101, 102 not only protect the panel module 20 but also provide aesthetic benefits.

The panel module 20 is joined with the rear cover 102 of the housing 10 by a fastening device, such as screws 30, mating with holes 103, 201 on the side surface of the rear cover 102. Although design may provide a narrow frame structure (with frame thickness d as narrow as possible), the assembling process is complicated. During assembly, one operator needs to fix the first side of the cover, turns the display, and then fastens the other side of the display so as to affect the productivity and efficiency.

Figure 2:
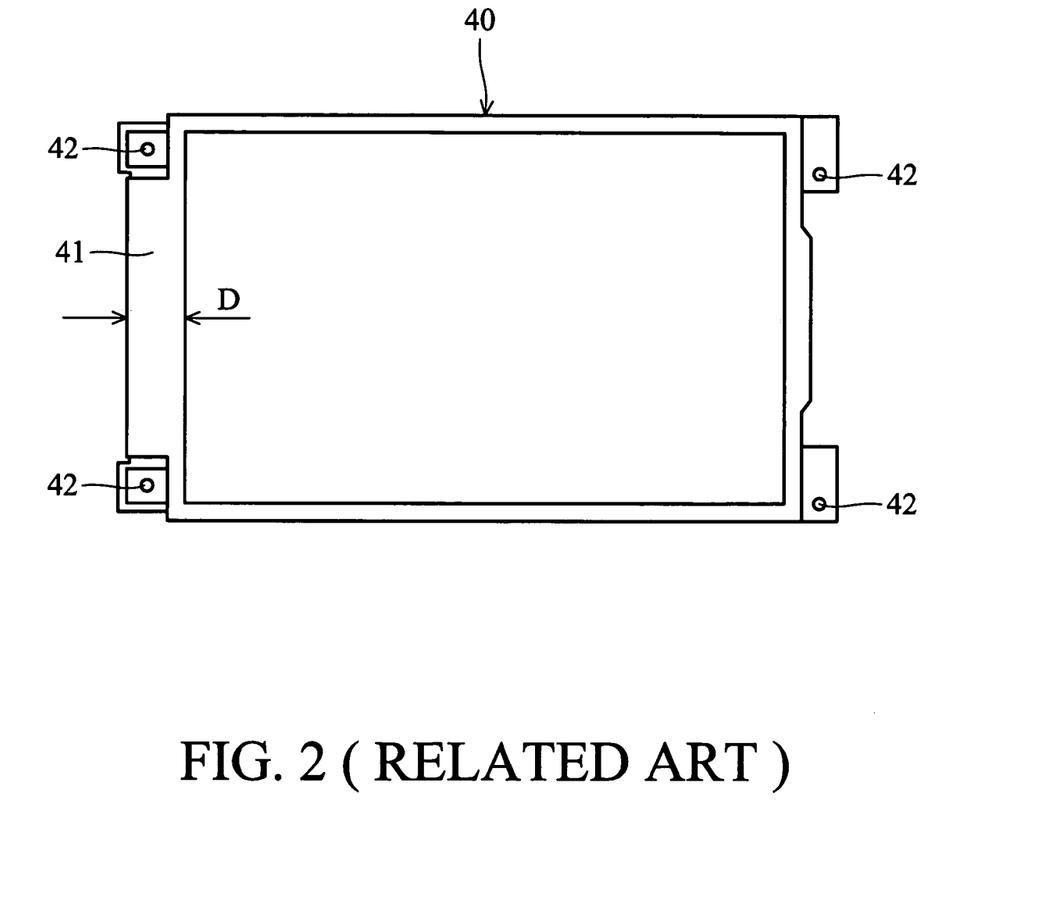
FIG. 2 is a top view of a panel module of another liquid crystal display disclosed in U.S. Pat. No. 5,835,139.

The cited disclosure also provides another liquid crystal display as shown in FIG. 2. Screw holes 42 are disposed on the front side of the panel module 40. In this case, although there is no need to rotate the panel module 40 during assembly, the placement of the screw holes on the front side increases wall thickness D of the frame 41. As a result, the object of a narrow frame profile is compromised. Similar problems occur in other types of flat panel displays.

SUMMARY OF THE INVENTION

Thus, an object of the invention is to provide a flat panel display and panel module thereof, with narrower frame design.

The present invention provides a flat panel display comprising a housing, a panel module, and a main bracket. The panel module, disposed in the housing, includes a front frame, a rear frame, and a panel. The front and the rear frame encase the panel. The rear frame has at least one connecting portion and a part of the connecting portion being covered by the panel. The main bracket connects the housing and the connecting portion of the rear frame.

Accordingly, the connecting portion of the rear frame is fixed to the main bracket by screws.

The connecting portion is formed by lancing and bending the rear frame.

The connecting portion is riveted to the rear frame.

The connecting portion is formed by slitting and pressing the rear frame.

The connecting portion is formed by deep drawing of the rear frame.

The present invention further provides a flat panel display comprising a housing, a panel module, and a main bracket. The panel module, disposed in the housing, includes a front frame, a rear frame, and a panel. The front and the rear frame encase the panel. The rear frame comprises a receiving portion supporting the panel, a peripheral portion located at periphery of the receiving portion, and at least one connecting portion. A part of the connecting portion is covered by the panel. The main bracket connects the housing and the connecting portion of the rear frame.

The rear frame is fixed to the main bracket by screws.

The connecting portion extends from the peripheral portion for a predetermined distance, and is bent to the rear of the receiving portion.

The connecting portion is completely disposed on the receiving portion.

The connecting portion is a post, an L-shaped protrusion, a bridge-shaped protrusion, or a circular protrusion.

The connecting portion is disposed in the vicinity of the peripheral portion.

The present invention further provides a panel module comprising a panel, a front frame, and a rear frame. The rear frame is connected to the front frame to position the panel therebetween. The rear frame comprises a fastening portion for a fastening device to be mounted therein, and a part of the fastening portion is covered by the panel.

Accordingly, the fastening device is a screw.

The fastening portion is formed by lancing and bending the rear frame.

The fastening portion is riveted to the rear frame.

The fastening portion is formed by slitting and pressing the rear frame.

The fastening portion is formed by deep drawing of the rear frame.

The present invention further provides a panel module comprising a panel, a front frame, and a rear frame. The rear frame is connected with the front frame to position the panel therebetween. The rear frame has a receiving portion supporting the panel, a peripheral portion located at the periphery of the receiving portion, and at least one fastening portion for mounting a fastening device therein, and a part of the fastening portion is positioned on the receiving portion or extends to a back of the receiving portion.

The fastening device is a screw.

The fastening portion is extended from the peripheral portion for a predetermined distance and bent to the back of the receiving portion.

The fastening portion is disposed on the receiving portion.

The fastening portion is a post, an L-shaped protrusion, a bridge-shaped protrusion, or a circular protrusion.

The fastening portion is disposed in the vicinity of the peripheral portion.

The present invention further provides a flat panel display comprising a panel, a front frame, a receiving portion, a peripheral portion, a connecting portion, and a housing. The front frame is disposed in front of the panel. The receiving portion is disposed behind the panel. The peripheral portion is located at the periphery of the receiving portion. The connecting portion has an arm and a connecting surface. The arm connects to one of the receiving portion and the peripheral portion. The connecting surface connects to the arm substantially extending to a back of the receiving portion. The housing is engaged with the panel by the connecting surface of the connecting portion.

A screw hole is formed on the connecting surface for a screw to be mounted therein, and the housing is fixed to the connecting portion by the screw.

The connecting portion is a reversed U-shaped protrusion, a partial-spherical protrusion, or a cylindrical protrusion, and the connecting surface tips the connecting portion.

The connecting portion comprises a screw post, disposed on the receiving portion.

The flat panel display further comprises a bracket, positioned between the connecting portion and the housing, and the connecting portion and housing respectively connected to the bracket at different locations.

The bracket has an edge. The connecting portion is engaged with the bracket at a first location. The housing is engaged with the bracket at a second location. The first location is closer to the edge of the bracket than the second location does.

The present invention further provides a flat panel display comprising a panel, a front frame, a receiving portion, a receiving portion, a peripheral portion, a connecting portion, and a housing. The front frame is disposed in front of the panel. The receiving portion is disposed behind the panel. The peripheral portion is located at the periphery of the receiving portion. The connecting portion has a protrusion and a connecting surface. The protrusion connects to one of the receiving portion and the peripheral portion. The protrusion substantially extends to a back of the receiving portion. The housing is engaged with the panel by the connecting surface of the connecting portion.

At least a part of the connecting portion is disposed on the receiving portion and partly disposed on the back thereof. As a result, there is no need to rotate the panel, with direct assembly of the bracket and the panel from the rear provided. Thus, productivity and efficiency are greatly improved. Moreover, the rear frame is connected to the main bracket by the connecting portion. Because this connecting portion is partly disposed on the receiving portion or partly extends to back thereof, the connecting portion reduces thickness of the rear frame.

Thus, the flat panel display and panel module thereof provides better productivity.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

A detailed description of the present invention is provided in the following.

First Embodiment

Figure 3:
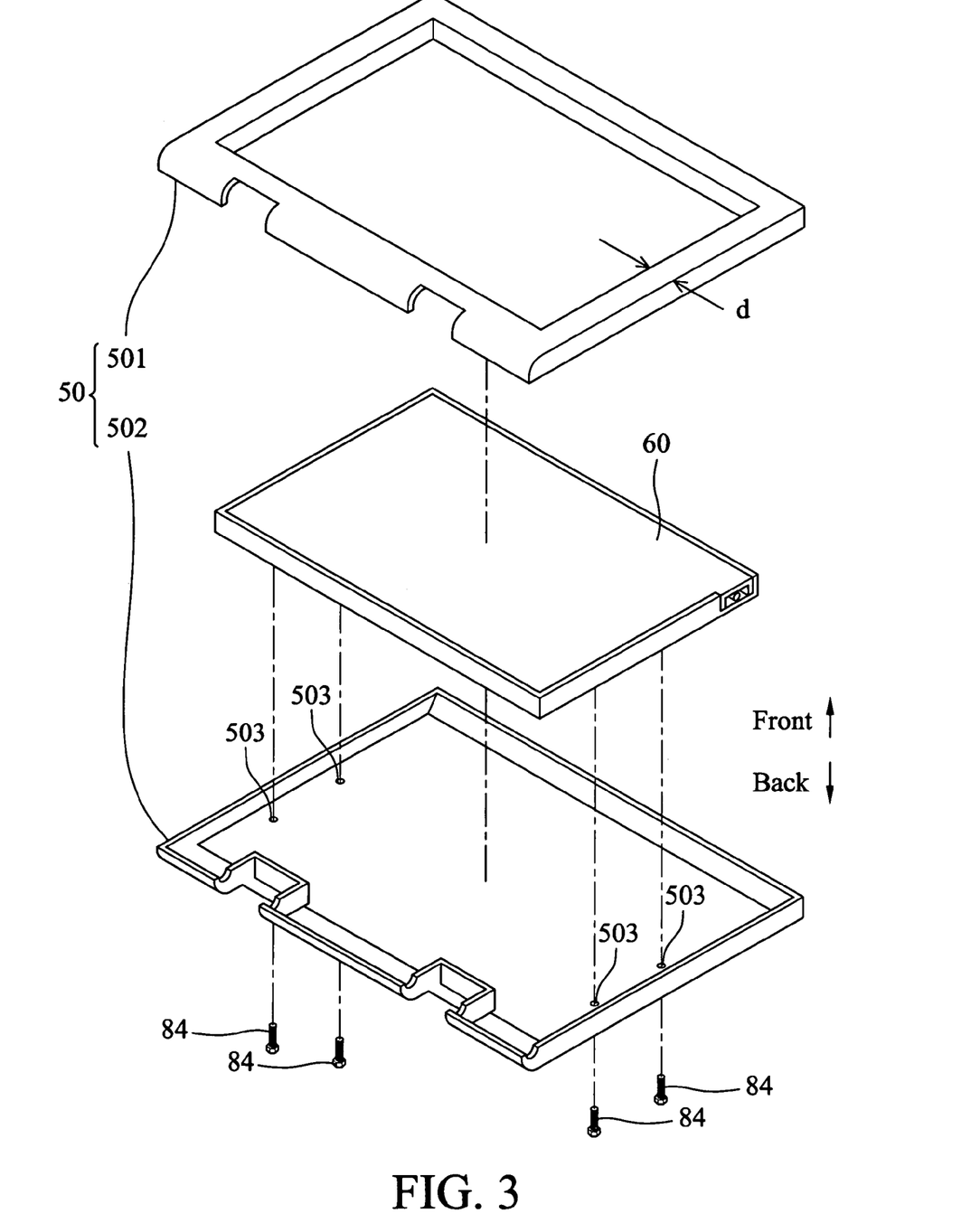
FIG. 3 is an exploded view of a liquid crystal display according to a first embodiment of the present invention.

FIG. 3 is an exploded view of a liquid crystal display according to a first embodiment of the present invention. The liquid crystal display includes a housing 50 and a panel module 60. The housing 50 has a front cover 501 and a rear cover 502, housing the panel module 60 therein.

A plurality of screw holes (not shown in FIG. 3, but described subsequently) are positioned on a rear side of the panel module 60 so that screws 84 directly fix the panel module 60 to the rear cover 502 from the rear side of the panel module 60. The panel module 60 does not need to be rotated during assembling process of the liquid crystal display, thus increasing speed of assembly.

In addition, another advantage of the present invention is provision of a narrow frame described subsequently.

Figure 4:
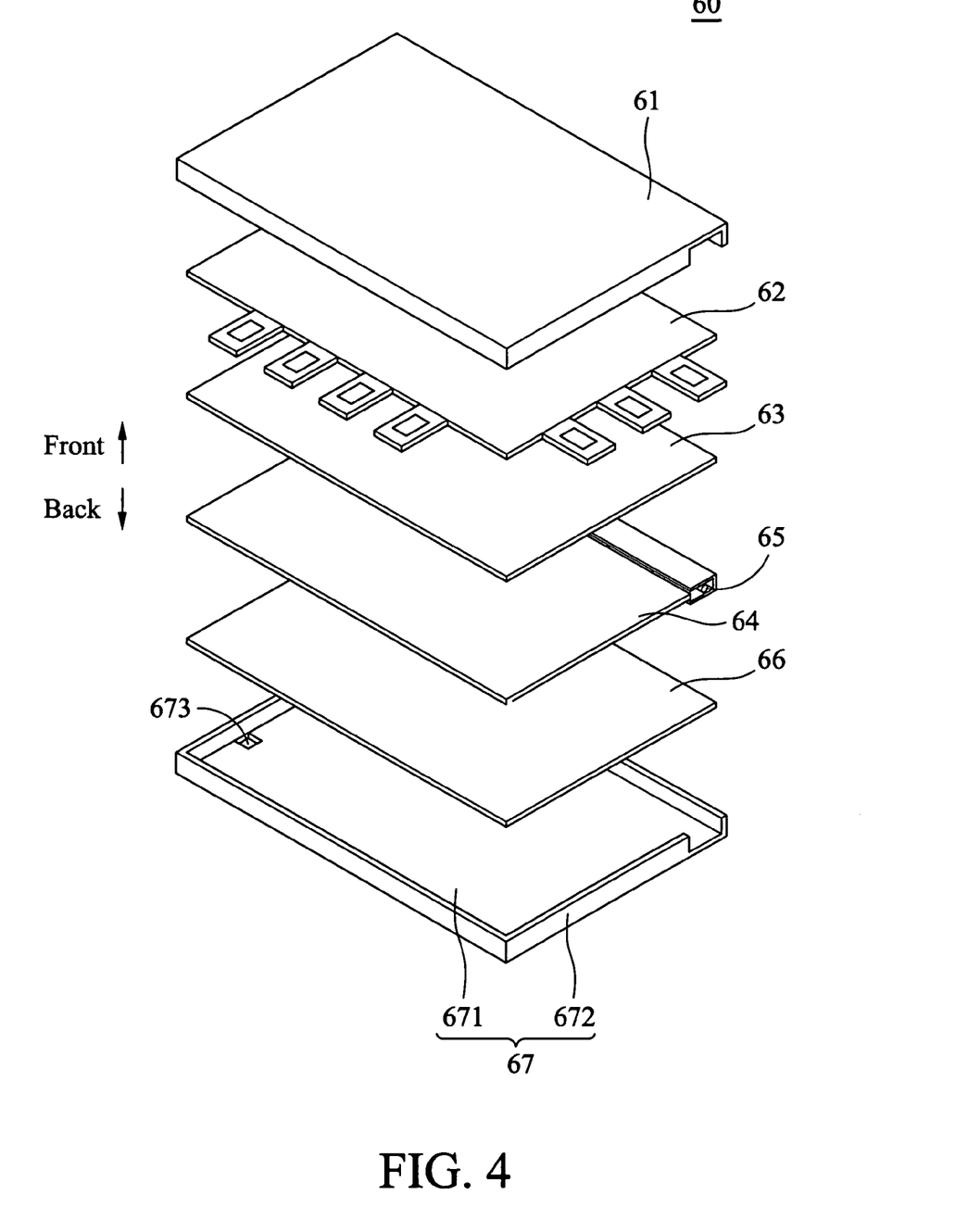
FIG. 4 is an exploded view of a panel module according to a first embodiment of the present invention.

FIG. 4 is an exploded view of the panel according to a first embodiment of the present invention. The panel module 60 has a front frame 61 and a rear frame 67. A panel 62, at least one optical film 63, a light guide 64, a light source 65, and a reflecting plate 66 are positioned between the front frame 61 and the rear frame 67. The shape of the rear frame 67 is similar to a rectangular box without a lid. Specifically, the rear frame 67 includes a receiving portion 671 and a peripheral portion 672. The receiving portion 671 supports the panel module 62, the optical film 63, the light guide 64, and the reflective sheet 66. The peripheral portion 672 is located at periphery of the receiving portion 671, that is, the peripheral portion 672 surrounds the receiving portion 671.

Figure 5:
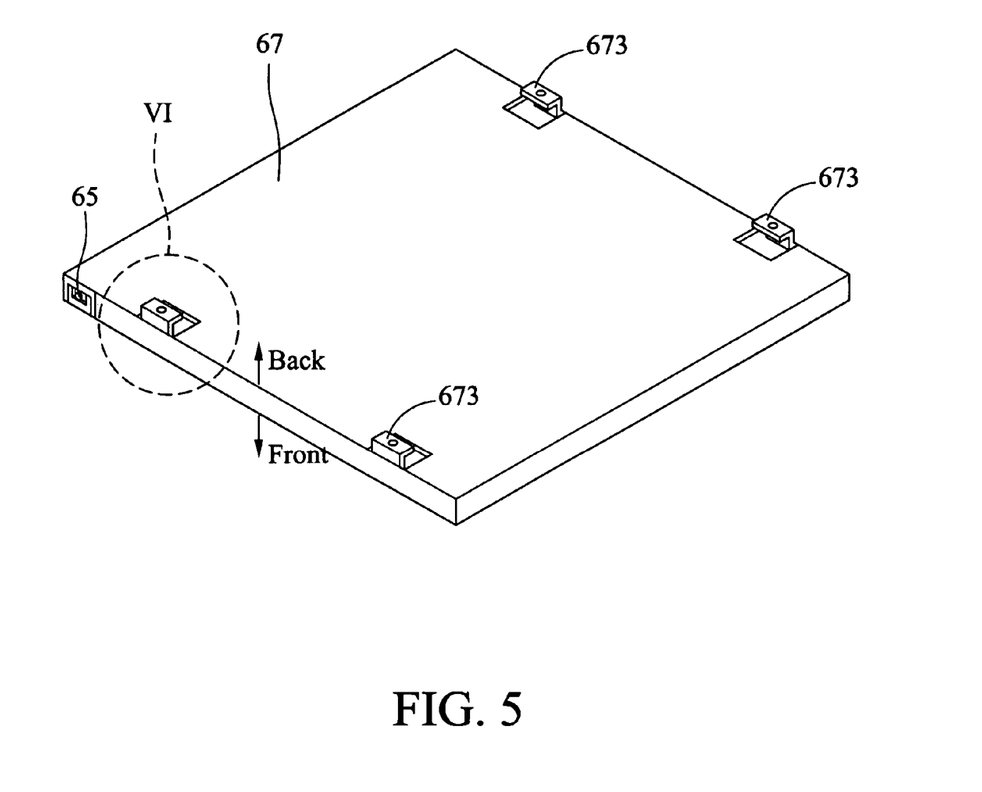
FIG. 5 is a perspective view of the panel module viewed from the back according to the present invention.
Figure 6A:
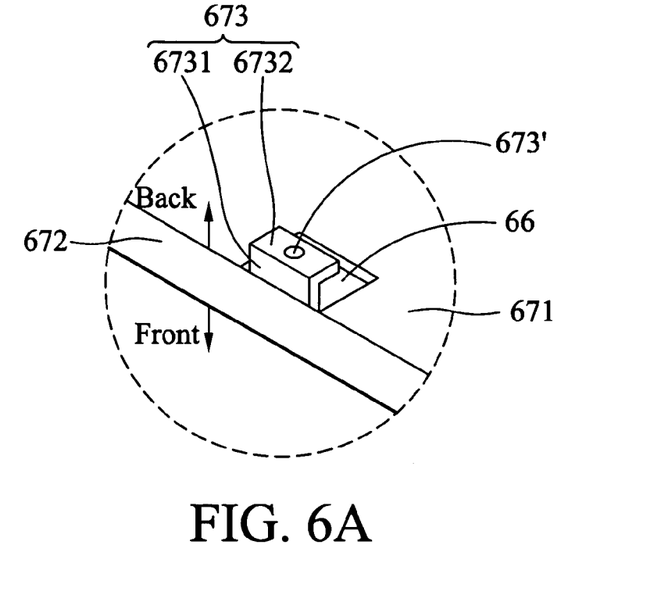
FIG. 6A is an enlarged view of a first connecting portion of the panel module.

FIG. 5 is a perspective view of the panel viewed from the rear, and FIG. 6A an enlarged view of FIG. 5. As shown, the back of rear frame 67 has a plurality of connecting portions 673, formed by lancing and bending of the rear frame 67. Lastly, a screw hole 673' is formed on each connecting portion 673 so as to mount a screw 84 (as shown in FIG. 3) therein. Thus, the connecting portion 673 functions as a fastening portion.

The connecting portion 673 includes a protrusion (or arm) 6731 and a connecting surface 6732. In this embodiment, the connecting portion 673 extends a predetermined distance from the peripheral portion 672 of the rear frame 67 to form the arm 6731, and then bends to form the connecting surface 6732. The connecting surface 6732 of the connecting portion 673 is covered by the panel, that is, the connecting surface 6732 is substantially positioned on or extends to the back of the receiving portion 671. In this embodiment, the connecting portion 673 is an L-shaped protrusion. The connecting surface 6732 is positioned at a top of the L-shaped protrusion.

In the present invention, a narrow frame is provided by simpler and more efficient engagement between the panel module 60 and the rear cover 502 of the housing 50; that is, the panel module 60 is connected to the connecting portion 673 of the rear frame 67 by passing the screw 84 through the screw hole 503. As shown in FIG. 6A, the connecting surface 6732 is located on the back of the receiving portion 671 of the rear frame 67. The protrusion (or arm) 6731 does not increase width of the peripheral portion 672 of the rear frame 67, providing a narrow frame profile for the liquid crystal display.

The connecting portion 673 is preferably disposed in a location on the rear frame 67 with a larger strength so that less panel damage, such as a ripple pattern, will occur during the installation of the panel module 60. For example, the connection portion 673 can be positioned on places near the peripheral portion 672. The following reveals other possible designs of the connecting portion.

Figure 6B:
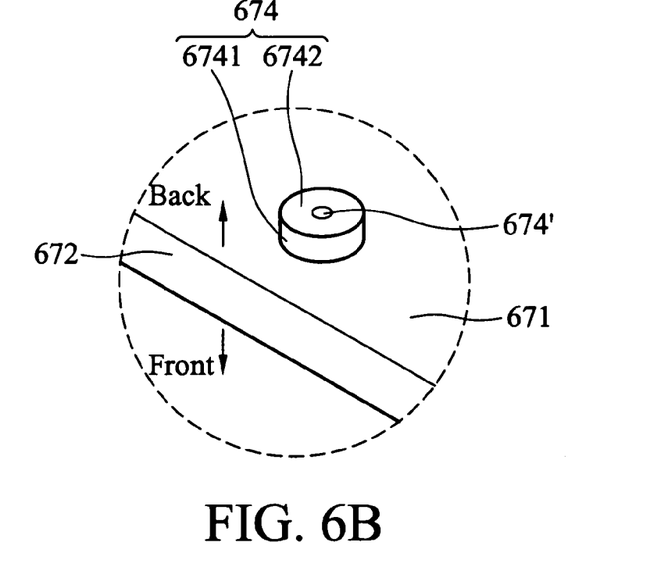
FIG. 6B is a schematic view of a second connecting portion of the panel module according to the first embodiment.

As shown in FIG. 6B, another kind of the connecting portion is a cylindrical protrusion 674, and directly riveted to the back of the receiving portion 671 on the rear frame 67. The screw 84 (as shown in FIG. 3) is mounted into the screw hole 674'. The connecting portion 674 includes a protrusion 6741 and a connecting surface 6742. The protrusion 6741 protrudes from the receiving portion 671 of rear frame 67, and extends toward the back of the rear frame 67 for a predetermined distance. The connecting surface 6742 tips the cylindrical protrusion 6741.

Figure 6C:
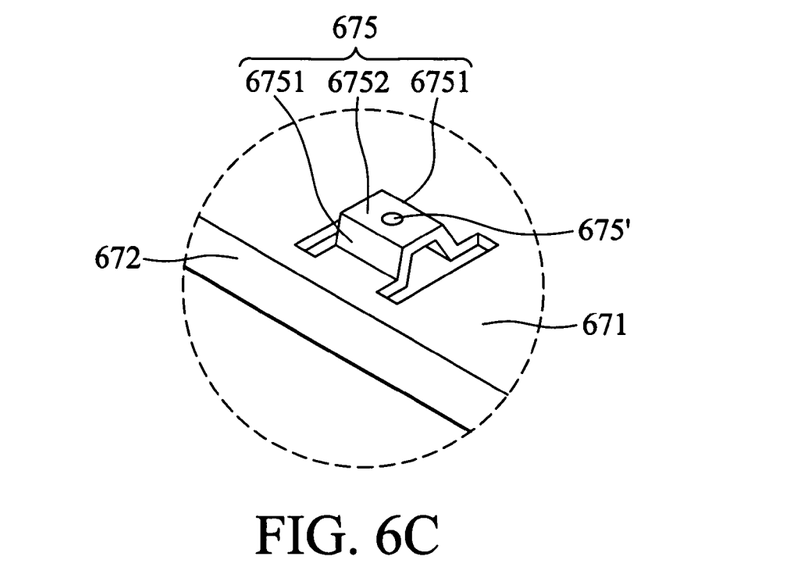
FIG. 6C is a schematic view of a third connecting portion of the panel module according to the first embodiment.

As shown in FIG. 6C, a connecting portion 675 is formed by slitting the receiving portion 671 of the rear frame 67 followed by pressing to form a bridge-shaped or a reversed U-shaped protrusion. Next, each connecting portion 675 is punched with a screw hole 675', such that the screw 84 in FIG. 3 can be mounted therein. The connecting portion 675 includes two protrusions 6751 and a connecting surface 6752. The protrusions 6751 extend from the receiving portion 671 of the rear frame 67 to the rear thereof for a predetermined distance, connecting with the connecting surface 6752. The connecting surface 6752 tips the reversed U-shaped protrusion.

Figure 6D:
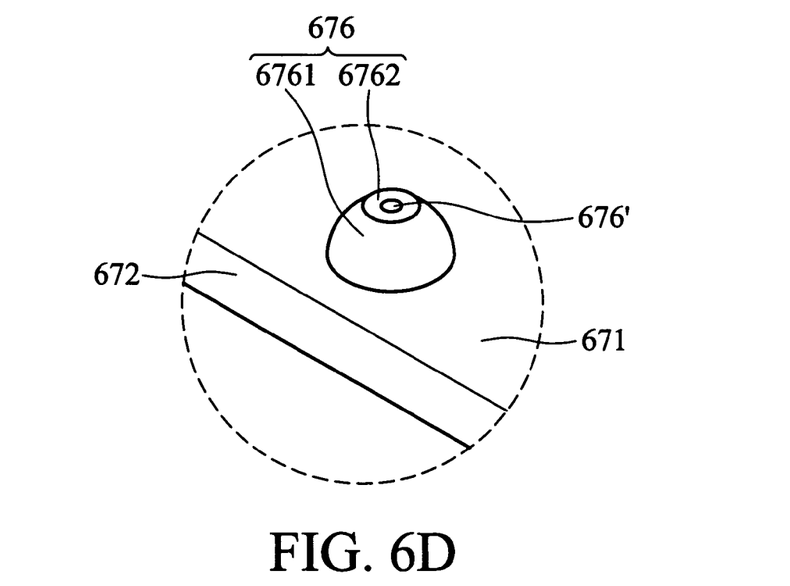
FIG. 6D is a schematic view of a fourth connecting portion of the panel module according to the first embodiment.

As shown in FIG. 6D, the connecting portion 676 is formed by deep drawing of the receiving portion 671 of the rear frame 67 to form a protrusion with circular section. Next, a screw hole 676' is provided in the connecting potion 676 for the screw 84 of FIG. 3 to be mounted therein. The connecting portion 674 has a protrusion 6761 and a connecting surface 6762. The protrusion 6761 extends from the receiving portion 671 of the rear frame 67 to the rear thereof for a predetermined distance, connecting with the connecting surface 6762. The protrusion is partial-spherical. The connecting surface 6762 tips the partial-spherical protrusion 6761.

Second Embodiment

Figure 7:
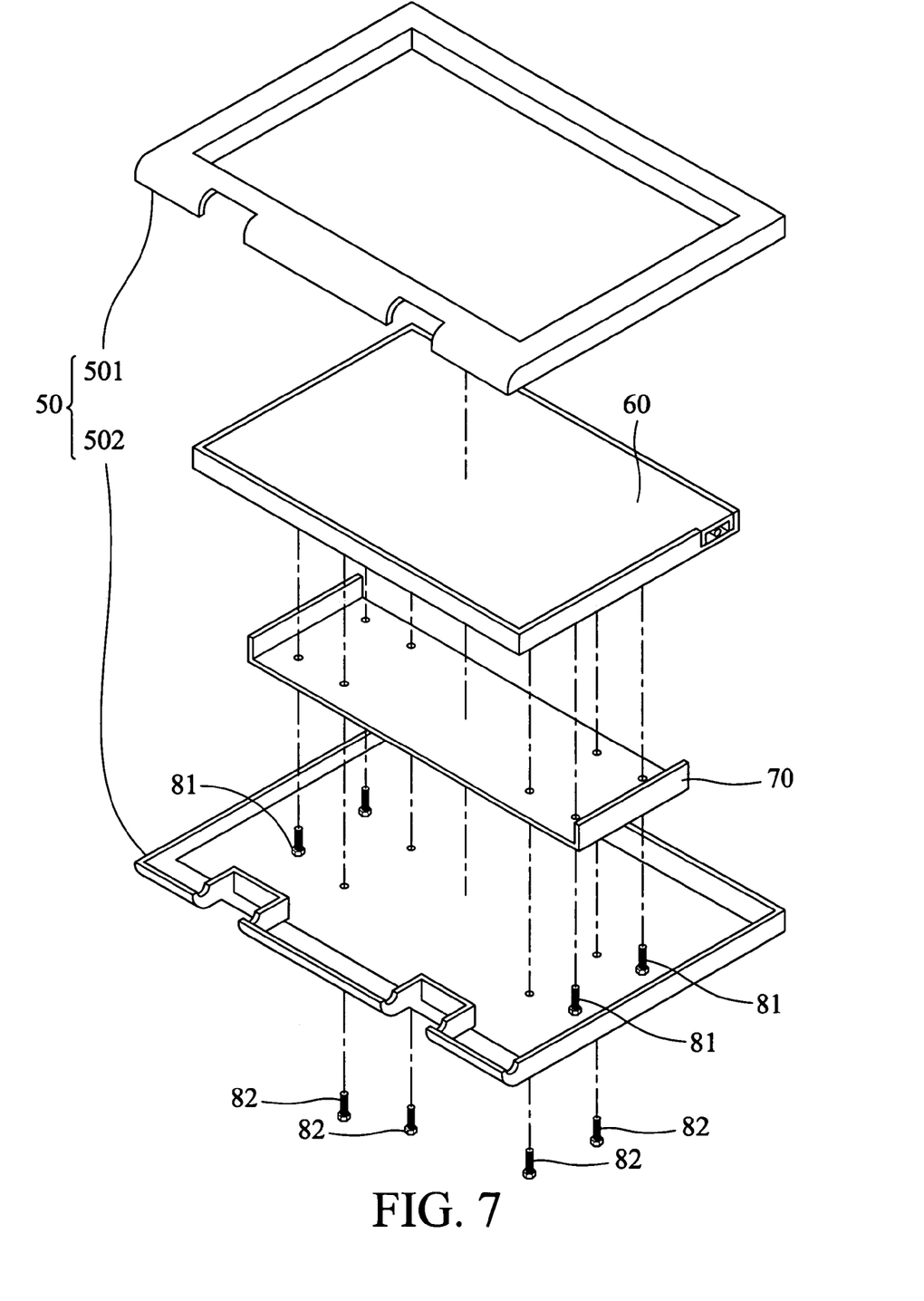
FIG. 7 is a perspective exploded view of the liquid crystal display according to a second embodiment of the present invention.

FIG. 7 is a perspective exploded view of a liquid crystal display according to a second embodiment of the present invention. The symbols of the second embodiment are identical to those of the first embodiment, and thus explanation is omitted here. In the second embodiment, a main bracket 70 is introduced. The panel module 60 is secured to the rear cover 502 of the housing 50 by this main bracket 70. Specifically, a screw 81 fixes the connecting portion 673, 674, 675, or 676 of the panel module 60 to the main bracket 70, further engaged with the rear cover 502 by screw 82. It should be noted that the screws 81 and 82 are disposed in different locations of the main bracket 70. Moreover, the screw 81 is closer to two sides of the main bracket 70 than the screw 82. As a result, the screw 81 and the connecting portions 673, 674, 675, or 676 are connected closer to the peripheral portion 672, providing enhanced structural strength.

In conclusion, the present invention not only provides better productivity during assembly of a liquid crystal display, but also provides a narrower frame profile.

Furthermore, in addition to application for liquid crystal display, the structural design of this invention can be applied to other flat panel displays, since, generally, all flat panel displays have a housing and a panel module disposed therein, to which the invention can be readily applied.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A panel module, comprising:
   a panel;
   a front frame; and
   a rear frame, connected with the front frame to position the panel therebetween;
   wherein the rear frame has a receiving portion supporting the panel, a peripheral portion located at the periphery of the receiving portion, and at least one fastening portion for mounting a fastening device therein, and the fastening portion is extended from the peripheral portion for a predetermined distance and bent to the back of the receiving portion.

2. The panel module as claimed in claim 1, wherein the fastening device is a screw.

3. The panel module as claimed in claim 1, wherein the fastening portion is an L-shaped protrusion.

4. A flat panel display, comprising:
   a housing;
   a panel module having a front frame, a rear frame, and a panel, the front frame being assembled with the rear frame to encase the panel, the rear frame having at least one connecting portion, and a part of the connecting portion being covered by the panel, wherein the connecting portion is an L-shaped protrusion; and
   a main bracket, connecting the housing and the connecting portion of the rear frame.

5. The flat panel display as claimed in claim 4, wherein the connecting portion of the rear frame is fixed to the main bracket by screws.

6. The flat panel display as claimed in claim 4, wherein the connecting portion is formed by lancing and bending the rear frame.

7. A flat panel display, comprising:
   a housing;
   a panel module having a front frame, a rear frame, and a panel, and the front frame being assembled with the rear frame to encase the panel; and
   a main bracket disposed in the housing;
   wherein the rear frame comprises a receiving portion supporting the panel, a peripheral portion located at periphery of the receiving portion, and at least one connecting portion, a part of the connecting portion is covered by the panel, and the connecting portion is an L-shaped protrusion; and the main bracket connects the housing and the connecting portion of the rear frame.

8. The flat panel display as claimed in claim 7, wherein the rear frame is fixed to the main bracket by screws.

9. The flat panel display as claimed in claim 7, wherein the connecting portion extends from the peripheral portion for a predetermined distance, and is bent to the rear of the receiving portion.

10. The flat panel display as claimed in claim 7, wherein the connecting portion is completely disposed on the receiving portion.

11. The flat panel display as claimed in claim 7, wherein the connecting portion is disposed in the vicinity of the peripheral portion.

12. A flat panel display, comprising:
a panel;
a front frame, disposed in front of the panel;
a receiving portion, disposed behind the panel;
a peripheral portion, located at the periphery of the receiving portion;
a connecting portion, having an arm and a connecting surface, the arm connecting to one of the receiving portion and the peripheral portion, the connecting surface connecting to the arm substantially extending to a back of the receiving portion; and
a housing, engaged with the panel by the connecting surface of the connecting portion, wherein the connecting portion is an L-shaped protrusion, and the connecting surface is positioned at a top of the L-shaped protrusion.

13. A flat panel display, comprising:
a panel;
a front frame, disposed in front of the panel;
a receiving portion, disposed behind the panel;
a peripheral portion, located at the periphery of the receiving portion;
a connecting portion having a protrusion and a connecting surface, the protrusion connecting to one of the receiving portion and the peripheral portion, the connecting surface and the protrusion substantially extending to a back of the receiving portion; and
a housing, engaged with the panel by the connecting surface of the connecting portion, wherein the connecting portion is an L-shaped protrusion, and the connecting surface is positioned at a top of the L-shaped protrusion.

14. The flat panel display as claimed in claim 13, further comprising a bracket, disposed between the connecting portion and the housing, and the connecting portion and the housing are respectively connected to the bracket at different locations.

15. A flat panel display, comprising:
a panel;
a front frame, disposed in front of the panel;
a receiving portion, disposed behind the panel;
a peripheral portion, located at the periphery of the receiving portion;
a connecting portion, having an arm and a connecting surface, the arm connecting to one of the receiving portion and the peripheral portion, the connecting surface connecting to the arm substantially extending to a back of the receiving portion;
a housing, engaged with the panel by the connecting surface of the connecting portion; and
a bracket, positioned between the connecting portion and the housing, and the connecting portion and housing respectively connected to the bracket at different locations.

16. The flat panel display as claimed in claim 15, wherein a screw hole is formed on the connecting surface for a screw to be mounted therein, and the housing is fixed to the connecting portion by the screw.

17. The flat panel display as claimed in claim 15, wherein the bracket has an edge, the connecting portion is engaged with the bracket at a first location, the housing is engaged with the bracket at a second location, and the first location is closer to the edge of the bracket than the second location.

18. A flat panel display, comprising:
a panel;
a front frame, disposed in front of the panel;
a receiving portion, disposed behind the panel;
a peripheral portion, located at the periphery of the receiving portion;
a connecting portion having an L-shaped protrusion and a connecting surface, the protrusion connecting to one of the receiving portion and the peripheral portion, the connecting surface and the protrusion substantially extending to a back of the receiving portion;
a housing, engaged with the panel by the connecting surface of the connecting portion; and
a bracket, disposed between the connecting portion and the housing, and the connecting portion and the housing are respectively connected to the bracket at different locations.

19. The flat panel display as claimed in claim 18, wherein a screw hole is formed on the connecting surface for a screw to be mounted therein, and the housing is fixed to the connecting portion by the screw.

20. The flat panel display as claimed in claim 18, wherein the bracket has an edge, the connecting portion is engaged with the bracket at a first location, and the housing is engaged with the bracket at a second location, and the first location is closer to the edge of the bracket than the second location.

* * * * *